Figure 1:
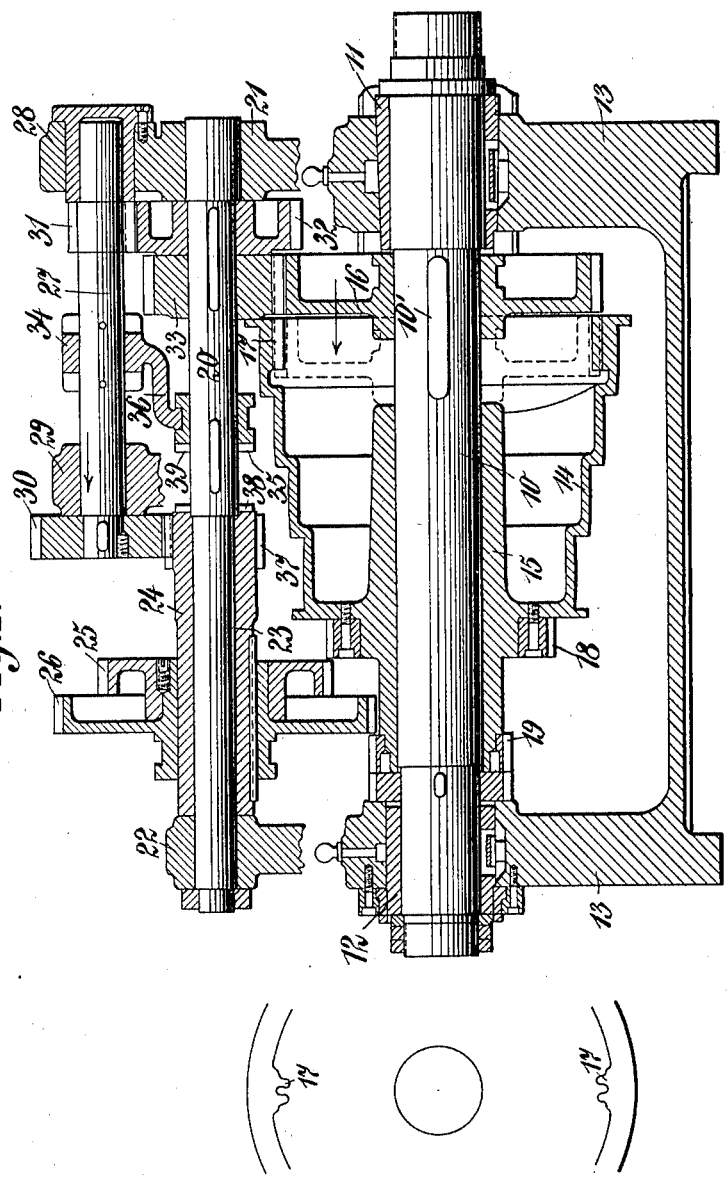

H. WERNER.
TRANSMISSION GEARING.
APPLICATION FILED MAY 28, 1912.

1,061,711.

Patented May 13, 1913.
2 SHEETS—SHEET 1.

Witnesses.
W. E. Allen
D. W. Edelin

Inventor.
Hans Werner.
By Serrell & Son
his Attorneys.

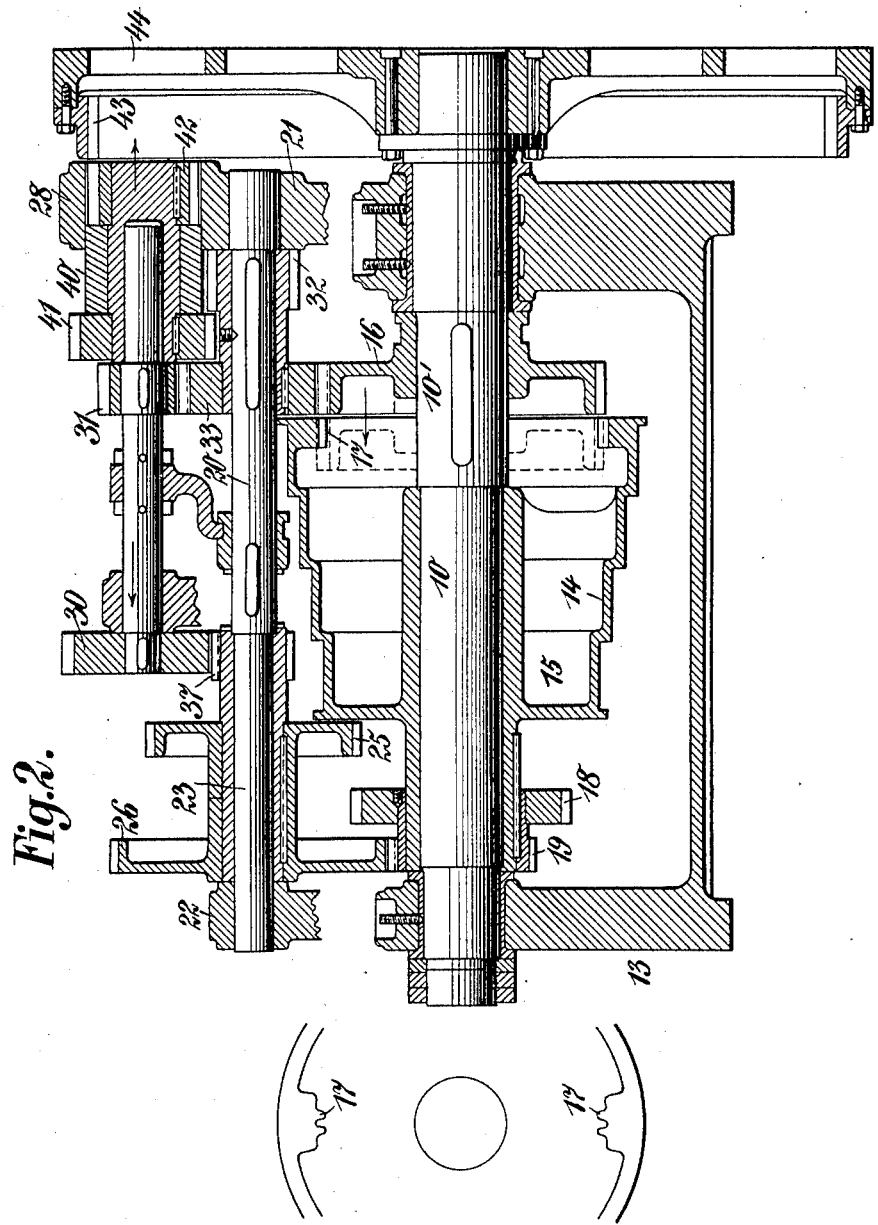

UNITED STATES PATENT OFFICE.

HANS WERNER, OF HANOVER, GERMANY.

TRANSMISSION-GEARING.

1,061,711.  Specification of Letters Patent.  Patented May 13, 1913.

Application filed May 28, 1912. Serial No. 700,187.

*To all whom it may concern:*

Be it known that I, HANS WERNER, a subject of the Emperor of Germany, residing at Hanover, Germany, have invented an Improvement in Transmission-Gearing, of which the following is a specification.

My present invention relates to a transmission gearing which is particularly applicable to direct belt driven head-stocks of lathes, but as will be understood, the invention is not limited to that particular use.

Heretofore, so far as I am aware, head-stocks of lathes have commonly been driven by counter-shafts and connected and disconnected by eccentrics, or the connecting or disconnecting of gear couplings and other mechanical devices,—all of which have been more or less complicated.

The object of my present invention is to dispense entirely with these aforesaid devices and to provide a transmission gearing for lathe head-stocks, in which I employ together with the spindle or driven shaft and the drive pulley, a means for directly connecting the spindle or driven shaft and the drive pulley and also for connecting the drive pulley to the spindle or driven shaft indirectly through the aforesaid means and a train or trains of gears, the shifting of the gears being effected by the operation of a suitable handle or handles in such a way that the gears are easily shifted to effect an immediate connection with the driven shaft or spindle, imparting thereto any one of a large number of different speeds, as will be hereinafter more particularly described.

In the drawing, Figure 1 is a diagrammatical representation of a head-stock fitted with a transmission gearing, in accordance with my invention, by means of which with a four-step drive pulley, the spindle or driven shaft may be turned at twenty different speeds, and Fig. 2 is a similar view showing a modified form of the invention in which the spindle or driven shaft may be turned at twenty-eight different speeds.

Referring to Fig. 1, 10 represents the spindle of the lathe or the driven shaft of any other mechanism. The spindle 10 is journaled in bearings 11 and 12, which are mounted upon a suitable support frame 13. On the spindle 10 there is a drive pulley 14, which as shown in this particular instance, is a four-step cone pulley, the hub of which is indicated at 15 and is mounted to revolve freely on the spindle 10.

16 represents a gear, which while keyed to the spindle 10 by the key 10' to prevent the same turning thereon, is nevertheless shiftable longitudinally on the spindle 10, the shifting being effected by any suitable means.

Interiorly the cone pulley 14, adjacent to the gear 16, is provided at suitable points with the teeth 17 adapted to mesh with the teeth of the gear 16 when the same is shifted from right to left or in the direction of the arrow, as shown in Fig. 1. Obviously when the internal teeth 17 of the cone pulley are engaged by the teeth of the gear 16, the spindle 10 is driven directly from the cone pulley through the gear 16. Adjacent to its smaller end, the cone pulley 14 is provided with a gear 18, and similarly at its extreme left hand end, as shown in Fig. 1, the sleeve hub 15 of the cone pulley 14, is provided with a gear 19. I also provide a gear shaft 20. This gear shaft is journaled in suitable bearings 21, 22, which are connected to the frame 13. The left hand end of the gear shaft 20 is of slightly reduced diameter, as indicated at 23. Loosely mounted on this reduced end 23 of the gear shaft 20, I employ a sleeve 24. Keyed to this sleeve 24 is a pair of gears 25, 26, of different diameters. The gear 25 is preferably of the same diameter as the gear 18 and the combined width of the gears 25 and 26 is substantially the distance between the gears 18, 19, and while the gears 25, 26, are keyed to the sleeve 24, they are nevertherless by suitable means shiftable on the sleeve 24, so that these gears 25, 26, may assume a position midway between the gears 18, 19, or they may be shifted to the right to bring the gear 25 into mesh with the gear 18, or to the left to bring the gear 26 into mesh with the gear 19. I also employ an auxiliary gear shaft 27. This gear shaft is suitably mounted in bearings 28, 29, connected like the other bearings to the frame 13. At the left hand end of the auxiliary gear shaft 27, as indicated in Fig. 1, the gear 30 is fixed. This gear 30 is adapted under certain conditions, to mesh with the gear 37 fixed on the right hand end of the sleeve 24. At the other or right hand end of the auxiliary gear shaft 27, I employ a gear 31. This gear 31 may under certain conditions mesh with the gear 32, fixed on the gear shaft 20. Also on the gear shaft 20, adjacent to the gear 32, is another gear 33, and the gear 16 may be shifted to position to mesh with the teeth of the gear 33. Fixed on the auxiliary gear shaft 27 there is a collar 34, and keyed but shiftable on the gear shaft 20 is a collar 35. An arm 36 is secured to the collar 34 at one end, and at the other end is adapted to engage a recess provided therefor in the collar 35.

The auxiliary gear shaft 27 with the gears 30, 31, thereon, may be shifted by suitable means from the position shown in Fig. 1, toward the left, so as to free the gear 30 from the gear 37, and the gear 31 from the gear 32. This right to left movement of the auxiliary gear shaft 37 also shifts the collar 35 so that the clutch teeth 39 thereon come into contact with and engage the clutch teeth 38 provided on the right hand end of the sleeve 34, so as to directly connect the sleeve 24 and the gear shaft 20.

The gear 16 may be shifted from the position shown in Fig. 1, wherein the teeth thereof are in engagement with the teeth of the gear 33, to a position within the cone pulley 14 in which the internal teeth 17 on the cone pulley mesh with the teeth of the gear 16, and the gear 16 may be still further shifted to the left, so that the cone pulley will run idly on the spindle 10, as shown in Fig. 2.

Now as will be understood from the foregoing, the gear 16 may be shifted to cause its teeth to mesh with the teeth 17 of the cone pulley, whereby the spindle will be driven directly and may be turned at any one of four speeds, depending upon which step of the cone the drive belt is applied.

Four different speeds may be obtained by shifting the gear 16 to cause the teeth thereof to mesh with the gear 33 and by shifting the gears 25, 26, so that the gear 25 meshes with the gear 18 and shifting the auxiliary gear shaft 27 in the direction of the arrow so as to disconnect the gears 30, 37 and 31, 32, and connect the clutch members 38, 39,— the spindle will then be driven from the cone pulley through the gears 18 and 25, the sleeve 24, the clutches 38, 39, the collar 35, the gear shaft 20, and the gears 33, 16, four different speeds being obtainable as before, depending upon the shifting of the belt from one to another of the steps of the drive pulley. Four additional speeds may be obtained by shifting the gears 25 and 26, so that the gear 26 will mesh with the gear 19, the other connections being the same as those described in the last preceding position. Four more speeds of the spindle 10 may be obtained by shifting the auxiliary gear shaft 27 back to the position shown in Fig. 1, wherein the gear 30 meshes with the gear 37, the gear 31 with the gear 32, and the clutch members 38, 39, are disconnected, the gear 25 being placed in position to mesh with the gear 18. In this position of the gears, the spindle 10 is driven through the pulley, the gears 18, 25, the sleeve 24, the gears 37, 30, the auxiliary gear shaft 27, the gears 31, 32, the gear shaft 20, and the gears 33, and 16. Four additional speeds may also be obtained by again shifting the gears 25, 26, to the left hand position in which the gear 26 meshes with the gear 19, the other connections being the same as those hereinbefore last described, making twenty different spindle speeds with a drive cone pulley having four steps.

Oftentimes as is well known, it may be desirable to drive the spindle of the lathe from a rim gear, and by reference to Fig. 2 it will be seen that there is disclosed therein an application of my invention by which a lathe spindle may be so driven. This transmission as shown in Fig. 2, is substantially the same as that shown in Fig. 1, with these exceptions,—the bearing 40 in which the right hand end of the auxiliary gear shaft 27 is mounted, is shiftable, is provided at its left hand end with a gear 41 and at its right hand end with a gear 42. The bearing is shiftable in the direction of the arrow, to cause the gear 42 to mesh with the internal gear 43 on the rim gear 44, and to cause the gear 41 to mesh with the gear 32 on the gear shaft 20. It will also be noted that the gears 25 and 26 in this structure are fixed on the sleeve 24, whereas the gears 18 and 19 are keyed to but shiftable on the sleeve hub 15 of the cone pulley 14. It will be obvious that the same twenty different speeds may be obtained by the gearing shown in Fig. 2, as those already hereinbefore described as obtainable with the structure shown in Fig. 1, and that also eight additional speeds may be obtained by the use of this structure shown in Fig. 2, by moving the shiftable bearing 40 to cause the gear 42 to mesh with the gear 43 and the gear 41 to mesh with the gear 32,—four being obtained by connecting the gear 18 with the gear 25 and four being obtained by connecting the gear 19 with the gear 26, in both cases the drive being effected through the rim gear 44, and in both instances also, the gear 16 is shifted sufficiently far to the left to pass entirely and freely within the cone pulley 14.

It will be apparent that instead of the gear transmission as hereinbefore described, friction gears or other similar devices may be used, without departing from the nature and spirit of my invention.

I claim as my invention:

1. In a transmission apparatus, the combination with a spindle and a drive pulley, of a train of transmission devices, and a device fixed to turn with the spindle and shiftable thereon, to engage and turn with the said pulley, to engage and turn with the said train of transmission devices, and to be disengaged from the said pulley and train of transmission devices.

2. In a gear transmission mechanism, the combination with a spindle and a drive pulley, of a train of gears and a device fixed to turn with the spindle and slidable thereon to one position to engage the pulley to be turned thereby and to another position to engagement with the train of gears to be turned by the same.

3. In a gear transmission mechanism, the combination with a spindle and a drive pulley thereon, of a train of gears and a device fixed to turn with the said spindle and shiftable thereon to one position to engage the pulley to be turned thereby and to another position to engagement with the said train of gears to be turned by the same.

4. In a gear transmission mechanism, the combination with a spindle and a drive pulley thereon, of a train of gears, a gear mounted on and fixed to turn with the spindle and slidable thereon to one position to engage the pulley to be turned thereby and to another position to engagement with the said train of gears to be turned by the same.

5. In a gear transmission mechanism, the combination with the driven shaft and a pulley loosely mounted thereon, of a gear shaft, gears secured to the gear shaft, a gear connected to the said pulley, and a gear fixed to turn on the said driven shaft and slidable thereon to engage the said pulley directly and also to engage one of the gears on the gear shaft to turn the spindle through the same and the said other gears.

6. In a gear transmission mechanism, the combination with the driven shaft and a drive pulley loosely mounted thereon, pulley gears connected with the said pulley, a gear shaft, gears on the said gear shaft, a pair of which are adapted respectively to mesh with the said pulley gears and a gear fixed to turn with the said driven shaft and slidable thereon to directly engage the said pulley and also to engage one of the said gears on the said gear shaft.

7. In a transmission gearing, the combination with a driven shaft and a pulley loosely mounted thereon, of gears connected with the said pulley, a gear shaft, a sleeve thereon, a pair of gears fixed to turn with the said sleeve and slidable thereon to engage the respective pulley gears, a clutch for connecting the gear shaft with the sleeve thereon, a gear on the said gear shaft and a gear on the said driven shaft fixed to turn therewith and slidable thereon to engage the said pulley directly and also to mesh with the said gear on the gear shaft.

8. In a transmission gearing, the combination with a driven shaft and a pulley loosely mounted thereon, of gears connected with the said pulley, a gear shaft, a sleeve thereon, a pair of gears fixed to turn with the said sleeve and slidable thereon to engage the respective pulley gears, a gear connected to the said sleeve on the said gear shaft, an auxiliary gear shaft, a gear thereon, adapted to mesh with the said gear on the said sleeve, a second gear also fixed on the said auxiliary gear, a pair of gears fixed on the said gear shaft, one of which is adapted to mesh with the said second gear of the auxiliary gear shaft, and a gear fixed and adapted to slide on the said driven shaft to directly engage the said drive pulley and also to mesh with the other gear on the said pair of gears fixed to the gear shaft.

9. In a transmission gearing, the combination with a driven shaft and a pulley loosely mounted thereon, of pulley gears connected with the pulley, a gear shaft, a sleeve thereon, a pair of gears fixed to turn with the sleeve and slidable thereon to engage with the pulley gears, a gear fixed on the said sleeve, an auxiliary gear shaft, a gear on the auxiliary gear shaft adapted to mesh with the gear on the said sleeve, a second gear on the auxiliary gear shaft, bearings in which the auxiliary gear shaft and the gears thereon are shiftable, a clutch operated by shifting the auxiliary gear shaft to engage the sleeve on the gear shaft and connect this sleeve with the gear shaft, a pair of gears fixed on the gear shaft, one of which is adapted to mesh with the said second gear of the auxiliary gear shaft, and a gear fixed and adapted to slide on the said driven shaft to directly engage the said drive pulley and also to mesh with the other gear of the said pair of gears fixed to the gear shaft.

10. In a transmission gearing, the combination with a driven shaft and a pulley loosely mounted thereon, of gears connected with the pulley, a gear shaft, a sleeve on the gear shaft, a pair of gears on the said sleeve adapted respectively to mesh with the gears on the pulley and also to be disengaged entirely therefrom, a gear connected to said sleeve, an auxiliary gear shaft, a gear thereon adapted to mesh with the gear on the said sleeve, a second gear on the said auxiliary gear shaft, a gear on the gear shaft, with which the last aforesaid gear is adapted to mesh, a fixed bearing in which one end of the auxiliary gear shaft is journaled, a slidable bearing in which the other end of the auxiliary gear shaft is journaled and in which bearing the said auxiliary gear shaft is shiftable, in order that the said gears thereon may be respectively disengaged from the said gear on the said sleeve and the gear on the said gear shaft, a clutch for engaging and connecting the said sleeve and gear shaft when the last aforesaid gears are disengaged, a rim gear connected to the said driven shaft, a gear on the shiftable bearing adapted to engage the rim gear, a second gear on the shiftable bearing, a second gear on the said gear shaft adapted when the shiftable bearing is moved, to bring the first gear thereon into engagement with the rim gear to engage the said second gear on the shiftable bearing, and a gear fixed and adapted to slide on the said driven shaft to directly engage the pulley and also to mesh with the said first gear of the gear shaft.

Signed by me this 10th day of May, 1912.

HANS WERNER.

Witnesses:
 JOHN HENELY REED,
 THOS. J. THOMPSON.

Copies of this patent may be obtained for five cents each, by addressing the "Commissioner of Patents, Washington, D. C."